Oct. 17, 1939.  H. F. FLOWERS  2,176,170
CONTROL MECHANISM FOR VEHICLES
Original Filed July 20, 1936  7 Sheets-Sheet 3

Inventor:
Henry F. Flowers,
by Mason & Porter
Att'ys.

Oct. 17, 1939.  H. F. FLOWERS  2,176,170
CONTROL MECHANISM FOR VEHICLES
Original Filed July 20, 1936   7 Sheets-Sheet 5

Inventor:
Henry F. Flowers,
by Mason & Porter
Attys.

Patented Oct. 17, 1939

2,176,170

UNITED STATES PATENT OFFICE 2,176,170

CONTROL MECHANISM FOR VEHICLES

Henry Fort Flowers, Findlay, Ohio

Application July 20, 1936, Serial No. 91,589
Renewed March 14, 1939

16 Claims. (Cl. 180—79.2)

The invention relates to new and useful improvements in a vehicle having opposed trucks or bogies, each of which carries two or more wheels, and wherein said trucks or bogies are mounted so as to turn independently about vertical axes.

An object of the invention is to provide a steering mechanism which is connected to the bogies so as to positively position said bogies whereby the treads of the wheels of the rear bogies will follow in the tracks of the treads of the wheels of the front bogies, whether said bogies are set for straight forward travel or for travel about a curved path to the right or the left.

A further object of the invention is to provide a steering mechanism wherein the bogies are turned about their vertical axes by a single rotatable steering shaft and are positively held in a set position when the rotations of said shaft cease.

A still further object of the invention is to provide a steering mechanism of the above type wherein the shaft is turned selectively in either direction by means of a fluid motor, and wherein the valves for controlling the fluid motor are actuated by a control stick.

A still further object of the invention is to provide a vehicle of the above type with a motor associated with each bogie for operating the wheels and a brake associated with each bogie wherein the motors may be controlled as to speed by a shifting of the control stick in one direction longitudinally of the vehicle and the braking mechanism controlled by a shifting of the control stick in the opposite direction.

These and other objects will in part be obvious and will in part be hereinafter more fully disclosed.

In the drawings which show by way of illustration one embodiment of the invention—

In my prior application Serial No. 721,234, filed April 18, 1934, there is shown and described a vehicle having trucks at the opposite sides thereof on which the body is independently mounted so that each truck may turn about a horizontal axis, also turn about a vertical axis and have a vertical movement relative to the body. These trucks are turned for steering the vehicle by a motor-operated means associated with each truck and controlled from a single source. The present invention has to do with an improvement in the steering mechanism for turning the trucks or bogies, and also in the control mechanism for the motors and the brakes for the bogie wheels. A mechanical steering unit has been provided which is connected to each of the bogies for the turning of the same. This steering unit includes a steering shaft which may be power-operated or operated by hand. The steering shaft has two sections, one of which has a right-hand thread and the other a left-hand thread. There is a steering head associated with each threaded section. One of these steering heads is connected to the forward bogie at the right when viewed in the direction of normal travel of the vehicle and to the rear bogie at the left of the vehicle. The other steering head is connected to the front bogie at the left of the vehicle and the rear bogie at the right of the vehicle.

When the steering heads are in a certain predetermined set position, the planes of rotation of the wheels on the front bogies will be coincident with the planes of rotation of the wheels on the rear bogies and the vehicle will travel in a straight path. The moving of the steering heads toward each other will turn the bogies so as to cause the vehicle to travel in a curved path to one side, and when the steering heads are moved away from each other, then the bogies will be set so that the vehicle will travel in a curved path to the other side. This steering shaft for the steering heads is either manually operated by a steering wheel at the front of the vehicle, or is power-operated by fluid means, the valve of which is controlled by a control stick likewise located at the front of the vehicle. When this control stick is moved in one direction, the valve is opened for supplying fluid to the motor to rotate the same and thus cause the steering heads to move either toward or from each other, depending upon the direction of rotation of the motor. When the control stick is moved in the opposite direction, then the fluid is directed to the motor so as to cause it to rotate in the opposite direction. When the control stick is moved in a direction substantially at right angles to the first movements described, and toward the front of the vehicle, then the valve is operated for applying the brakes, and when it is moved toward the rear of the vehicle, then the control for the motors is operated for determining the speed thereof.

Figure 1:
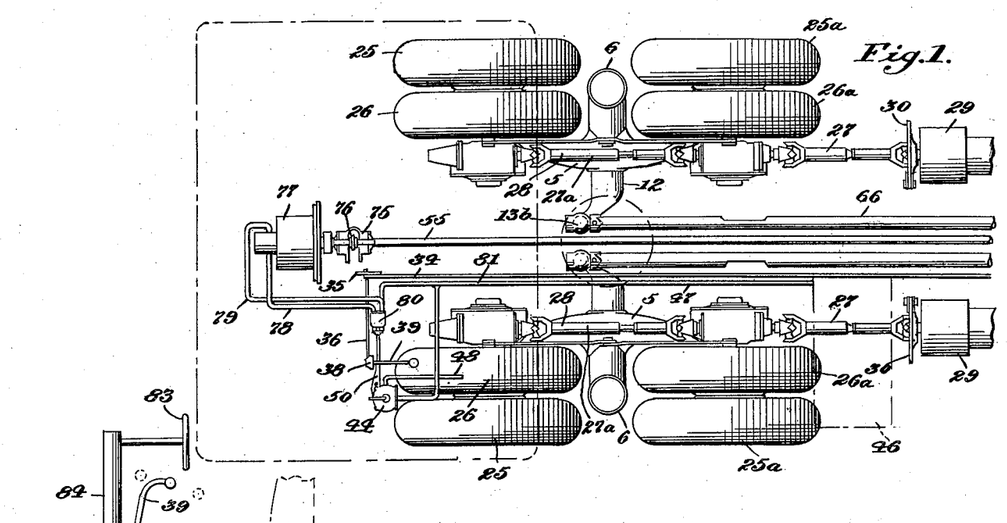
Figure 1 is a view showing more or less diagrammatically and in plan, the forward trucks or bogies of the vehicle, the driving means therefor, and the control means for turning the bogies to steer the vehicle.
Figure 2:
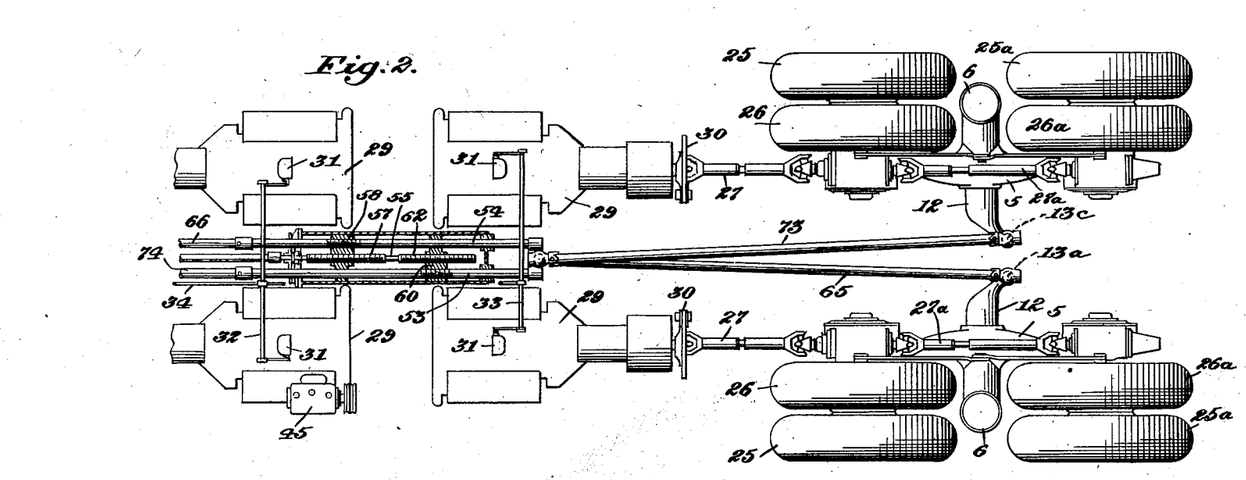
Fig. 2 is a view showing more or less diagrammatically and in plan, the trucks or bogies at the rear of the vehicle, the motors for operating all of the wheels of the bogies, and the steering mechanism for turning the bogies.
Figure 3:
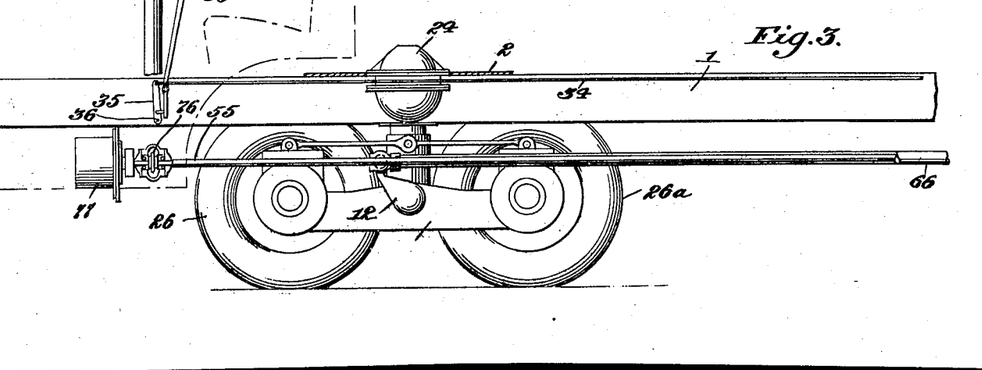
Fig. 3 is a vertical sectional view taken at one side of the center beam and showing more or less diagrammatically one of the bogies and the power-controlled steering mechanism therefor.
Figures 7, 10, 18:
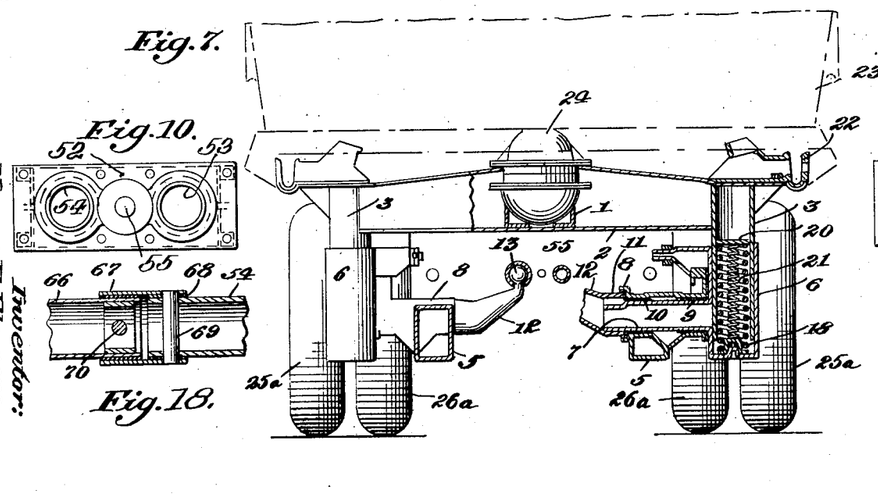
Fig. 7 is a view partly in end elevation and partly in vertical section through the vehicle, showing a portion of the supporting frame, the mounting of the body thereon and the lifting jack for tilting the body.
Fig. 10 is a view of the steering unit from the left-hand end thereof.
Fig. 18 is an enlarged detail showing the connections between the steering rods and the links which are attached to the bogies at the front of the vehicle.
Figures 8, 9:
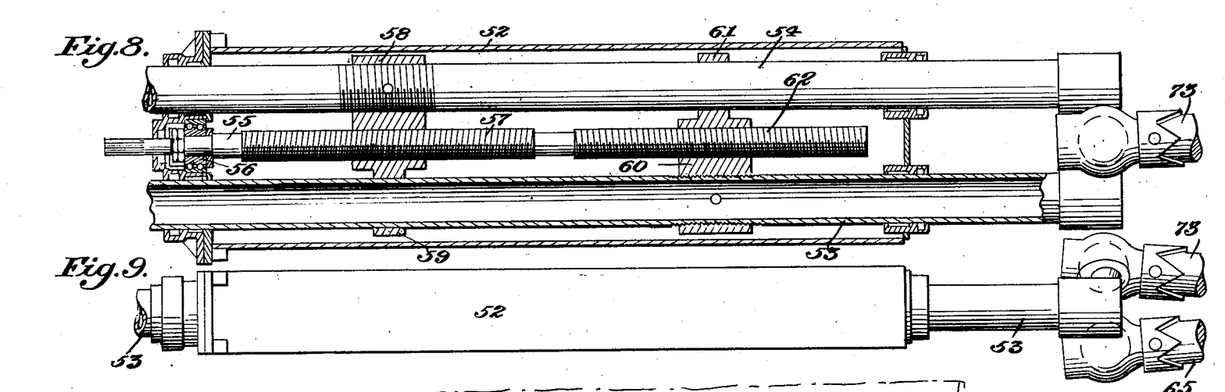
Fig. 8 is a view in horizontal section, showing on an enlarged scale, the steering unit for turning the bogies.
Fig. 9 is a side view of the steering unit as illustrated in Fig. 8.
Figure 11:
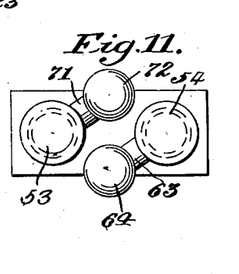
Fig. 11 is a view of the steering unit from the right-hand end thereof.

It is thought that the invention will be better understood by a detail description of the illustrated embodiment thereof. Figures 1 and 2 of the drawings should be considered together, as they show the entire length of the vehicle, and likewise, Figures 3 and 4. As shown in Fig. 7, the vehicle includes a frame having a center beam 1, rigid with which are cross frames or bolsters 2. There is a cross frame or bolster adjacent the front and rear ends of this center beam. These bolsters are each provided with a king post at the opposite ends thereof, and there is a bogie associated with each king post. The bogies are all of similar construction so far as the mounting of the frame is concerned, and the description of one will answer for the others. The king post is in the form of a sleeve which is rigidly attached to and depends from the end of the frame bolster. In Fig. 7 this king post is indicated at 3. Each bogie includes a frame for supporting the wheels. The bogie frame is illustrated at 5 in Fig. 7. Mounted on the king post 3 is a sleeve 6. Said sleeve has a comparatively tight sliding fit with the king post 3. Projecting laterally from this sleeve 6 is a gimbal support 7 which extends through a bearing sleeve 8 formed as a part of the bogie frame. There are bushings 9 and 10 carried by the frame through which this gimbal support 7 extends. Attached to the inner end of the gimbal support is a sleeve 11 carrying an arm 12. This arm 12 is provided with a sleeve which slips on to the end of the gimbal support. It is keyed to the end thereof so that the sleeve will not rotate on the gimbal support, and it is also keyed to the gimbal support so that it will not move endwise thereof. This makes a very rigid connection between the arm and the gimbal support and provides a positive means for turning the bogie about a vertical axis while permitting the bogie to oscillate about a horizontal axis. This arm 12 carries a ball 13 at its outer end. The steering unit is connected to this ball 13. The lower end of the sleeve 6 is closed as indicated at 14, and said closed end has an upwardly projecting boss 15 on which is mounted an abutment plate 16. There is a ball bearing 17 between the abutment plate and the boss, so that this abutment plate can turn freely on the boss.

A spring 18 rests at its lower end on a flange 19 carried by the abutment plate. The upper end of this spring 18 bears against a partition plate 20 located in the king post and welded thereto. There is also a second spring 21 which bears against the abutment plate and the partition plate 20. These two springs serve as a cushioning means between the bogie frame and the frame on which the body of the vehicle is supported. The springs permit a vertical movement of the bogie frame relative to the frame carrying the body. The gimbal connection between the bogie frame and the sleeve which slides on the king post permits the bogie frame to oscillate on a horizontal axis.

Each bolster at its outer end is provided with a bracket 22 on which the body indicated in broken lines at 23 is mounted. The mounting of the body is such that it may be tilted either about the bracket 22 at one side of the vehicle frame, or about a bracket 22 at the other side thereof. Mounted on the center beam is a lifting jack 24 which contacts with the body and is utilized for tilting the body. If it is desired to tilt the body to the right, as viewed in Fig. 7, then it will be latched down at the right, and when the jack 24 is operated, the body will be tilted about this bracket at the right of the figure. More than one jack may be used, if desired and various ways of mounting the body may be employed.

Each bogie is provided with a mounting for a wheel at its outer ends. This mounting for the wheel is shown and described in detail in my copending application Serial No. 91,590, filed of even date herewith. The wheel is constructed so as to carry two tires as illustrated in the present drawings. These tires are indicated at 25 and 26 on the wheel at the front of the bogie and at 25a and 26a on the wheel at the rear of the bogie. It will be noted that the bogie is located at one side of the wheels, while the axis of the king post lies in a vertical plane passing centrally between the tires, which in effect, is the plane of rotation of the wheels. This mounting of the bogie frame at one side of the king post permits the king post and the parts immediately associated therewith to be enclosed and of very rugged construction. Furthermore, when the wheels are mounted at one side of the bogie they can be readily removed and replaced without disassembling the bogie or the mounting means on which the bogie frame is supported. Instead of wheels having two tires, a wheel with one tire may be used or a wheel having flanges operating on tracks may be used.

As illustrated, each wheel is mounted on a spindle which is driven through suitable gear connection by a shaft 27. The shaft 27 has a universal joint connection with a short shaft operating the wheel at the end of the bogie nearest the motor, and the short shaft has a universal connection with a shaft 27a which operates through a universal connection a short shaft connected to the wheel at the other end of the bogie. This driving mechanism for the wheels of the bogies per se, forms no part of the present invention, but is shown and described in a co-pending application Serial No. 95,591 filed of even date herewith. The shaft 27 is connected to a motor 29. Each truck or bogie has its own individual driving motor. The bogie units and the driving means therefor are all substantially alike, and therefore, similar reference numerals have been applied to each bogie and the operating motor therefor. As shown in Figures 1 and 2, there is a disk braking mechanism 30 associated with each motor 29. The motors( as illustrated, are of the hydrocarbon type and each motor includes its controls 31 whereby it may be accelerated for controlling the speed of the vehicle. Associated with the control for the motors operating the wheels of the front bogies is a shaft 32 (see Fig. 2), and associated with the motors operating the wheels of the rear bogies is a shaft 33. These shafts 32 and 33 are connected by a rod 34a. A rod 34 is connected to the shaft 32 and when moved endwise will impart oscillations to said shafts 32 and 33 so as to control the fuel supply to the motors. The rod 34 is connected to a lever 35 at the forward end of the vehicle. The lever 35 is fixed to a shaft 36 carrying an arm 37 provided with a plate 38 at its upper end. This plate is disposed at the lower end of a control stick 39. The control stick is mounted in a bracket 40 so that it may be shifted forward and back, or shifted laterally. When the operator moves this control stick toward the rear of the vehicle, it will cause the lower end to contact with the plate 38 and oscillate the shaft 36. This is for accelerating the motors, and when the control stick is brought back to its normal initial position, suitable spring means will shift the motor controls so as to reduce the speed of the motors. Also mounted on the shaft 36 is an arm 41 connected by a link 42 to a foot-operated accelerator lever 43.

Figures 12, 13, 14, 15:
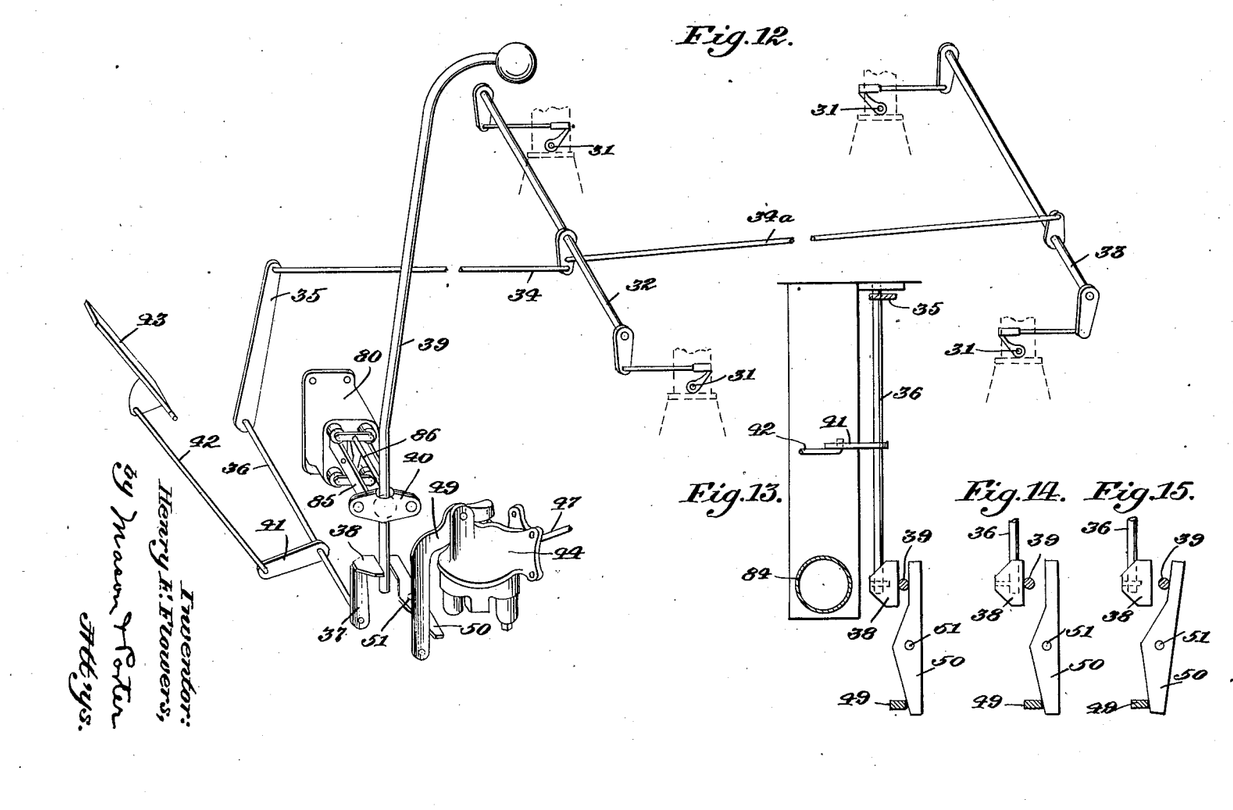
Fig. 12 is a perspective view showing the control mechanism for steering the vehicle, and also the control mechanism for the motors and for the brakes.
Fig. 13 is a view partly in section and showing more or less diagrammatically the positioning of the control parts when the brake and accelerator are released and with the wheels positioned for straight-ahead travel.
Fig. 14 is a view showing the shifting of the control stick for applying the brakes.
Fig. 15 is a view showing the shifting of the control stick for releasing the brakes and operating the accelerator control for the motor.

As shown in Fig. 12, there is a valve casing 44 which is connected up with the braking mechanism for the vehicle. Associated with one of the motors is a fluid pump 45 which supplies a pressure tank 46 indicated in broken lines in Fig. 1, with fluid under pressure. A pipe 47 leads from this tank to the valve casing 44. Suitable pipes lead from this valve casing to the various braking devices for applying the brakes when it is desired to stop the vehicle. A control pipe leading from the valve casing to the braking device is indicated at 48. There is a lever 49 mounted on the valve casing 44 for controlling the valves therein. This lever carries an arm which depends in front of a control bar 50 pivoted at 51. This control bar 51 lies in rear of the control stick 39, and if the control stick is moved toward the front of the vehicle, it will cause this bar to swing so as to open the valve and apply the brakes. It will be noted that the movement of the control stick toward the front of the vehicle applies to brakes, and the movement of the control stick toward the rear of the vehicle, releases the brakes and operates the accelerator. No matter what may be the position of the control stick as to its forward and backward movement, it can, at any time, be moved laterally, and it is the lateral movement of the control stick that turns the bogies for steering the vehicle.

Figure 4:
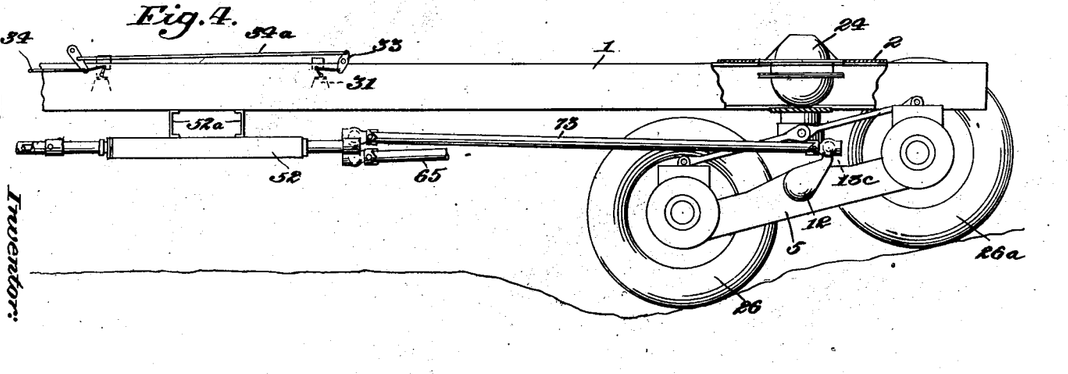
Fig. 4 is a view similar to Fig. 3 taken at the rear of the vehicle and showing the rear bogie tilted about a horizontal axis by the uneven terrain over which it is passing.

The steering mechanism for turning the trucks or bogies includes a housing 52 attached to the frame of the vehicle through the aid of supporting brackets 52a (see Fig. 4). Mounted in this housing 52 are two rods 53 and 54. Said rods are mounted so as to move independently in an endwise direction. Also mounted in the housing 52 is an actuating shaft 55. Said shaft is mounted in a thrust bearing 56 which prevents the shaft from moving endwise in either direction. This actuating shaft 55 has a threaded section 57 adapted to receive a steering head 58. The steering head 58 has a threaded connection with the rod 54, so that by turning the rod, the position of the steering head thereon can be shifted. A suitable key is provided for fastening the steering head in a set position on this rod 54. The steering head has an extension 59 which slides freely on the rod 53. The steering head has a threaded portion for engagement with the threaded section 57. There is a steering head 60 which has a threaded connection with the rod 53 so that it may be shifted to different set positions thereon. This steering head 60 also has an extension 61 which has a free sliding fit with the rod 54. The steering head 60 has a threaded portion which engages a threaded section 62 on the shaft 55. The threaded portions 57 and 62 are right and left-hand threads, so that when the shaft 55 is turned in one direction, the steering heads 60 and 58 will be moved toward each other, and when the shaft is turned in the other direction, they will be moved away from each other. Thus it is that the steering heads are shifted to different set positions and positively held in their set positions through the turning of the actuating shaft and the stopping of its rotation in the desired set position.

Figure 5:
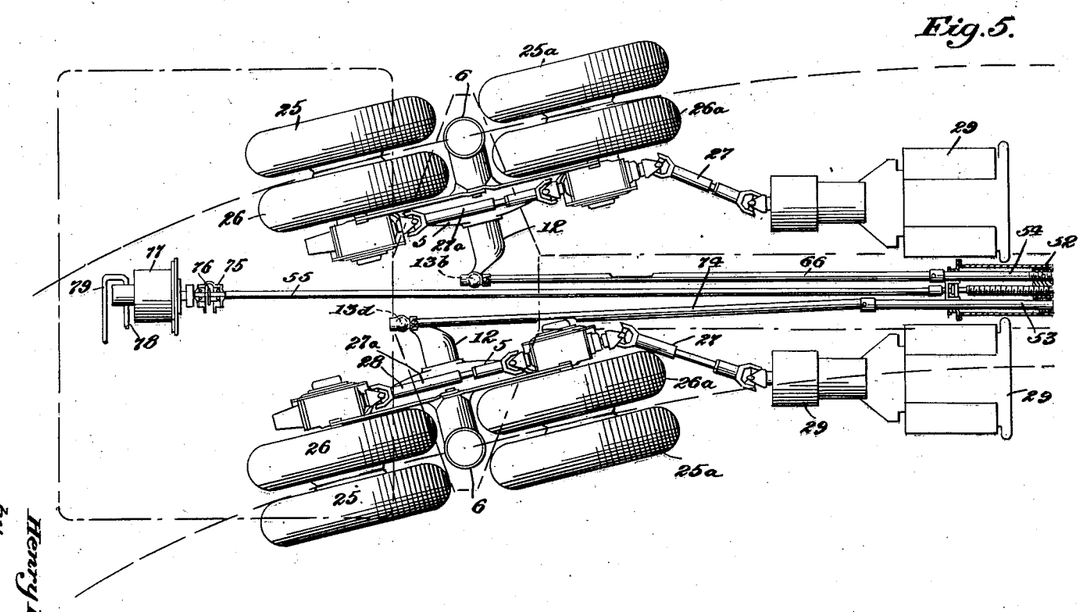
Fig. 5 is a view partly in plan and partly in section showing more or less diagrammatically the front bogies turned so as to travel in a curved path.
Figure 6:
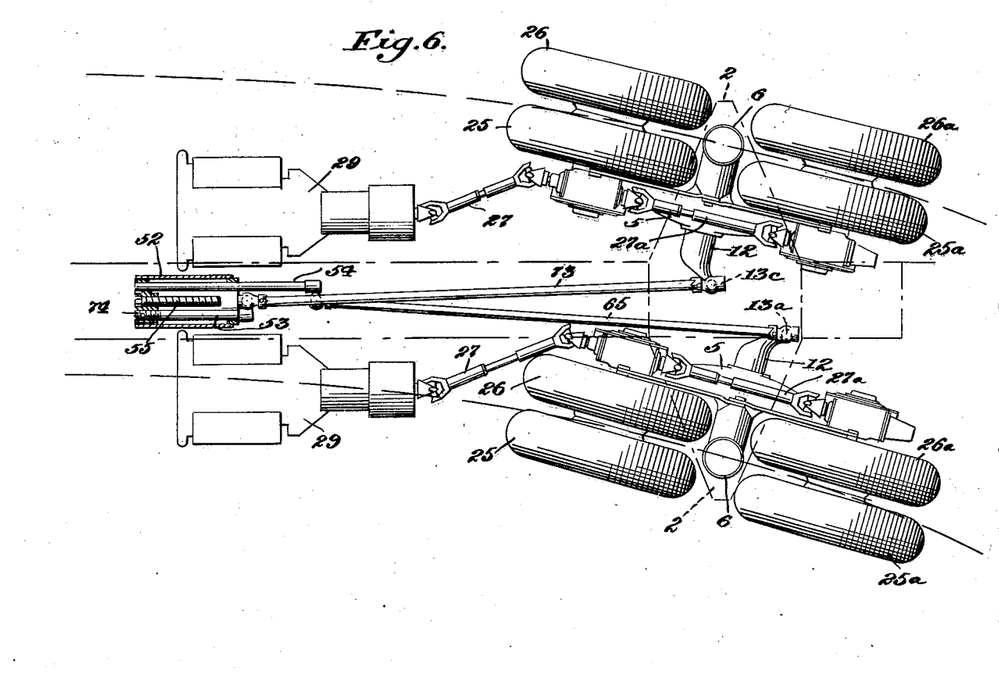
Fig. 6 is a view showing more or less diagrammatically, partly in plan and partly in section, the rear bogies which have been turned so that the wheels thereof follow the same curved tracks as the wheels of the forward bogies, as shown in Fig. 5.

The rod 54 at the right-hand end thereof, carries a laterally projecting arm 63 provided with a ball 64 at the outer end thereof. A link 65 engages the ball 64 at one end, and the ball 13a at the other end, which ball 13a is at the outer end of the arm 12 associated with the left-hand bogie at the rear of the vehicle. The other end of the rod 54 is connected to a link 66. This link 66 is connected at its outer end to a ball 13b at the outer end of the arm 12 which is associated with the right-hand bogie frame of the vehicle. When the shaft 55 was turned so as to move the rod 54 to the right, as shown in Figures 5 and 6, it simultaneously turned the right-hand forward bogie in one direction and the left-hand rear bogie in the opposite direction.

The rod 54 and the link 66 are of substantially the same diameter. They are connected by means of a sleeve 67 which is of slightly larger diameter. There is a rubber packing 68 between the sleeve and the ends of the rod and also the end of the link. A pin 69 extends through the sleeve and through the end of the rod 54. A pin 70 disposed at right angles to the pin 69 passes through the end of the link 66 and through the sleeve 67 (see Fig. 18). This provides a connection which permits a limited angular movement of the link relative to the rod 54.

The rod 53 carries an arm 71 at one end thereof to which is attached a ball 72. This ball 72 is connected to a link 73 which in turn is connected to the ball 13c at the outer end of the arm 12, carried by the frame of the rear right-hand bogie. The rod 53 at its other end is connected to a link 74 by means of a sleeve similar to the sleeve 67. The link 74 is connected to a ball 13d at the outer end of the arm 12 connected to the frame of the left-hand front bogie. When the shaft is turned so as to move the steering head 58 to the position shown in Fig. 5, then the steering head 60 is likewise moved in the opposite direction, and this will cause the link 74 to swing the left-hand forward bogie, as shown in Fig. 5, and the right-hand rear bogie to the position shown in Fig. 6.

It will be noted that the steering mechanism is connected to each arm by a ball and socket joint, and this permits the bogie to move vertically relative to the frame, to oscillate, and to swing about a vertical axis. The ball and socket connections on the front bogies are ahead of a transverse center plane through the king posts, and the similar connections to the rear bogies are behind a transverse vertical plane through the king posts, so that when bogies on the inner or short radius tracks are swung for rounding a curve, each bogie will swing through a greater arc about the king post than the corresponding bogies on the outer longer radius tracks. Therefore, when the bogies are swung for rounding a curve, a transverse plane through the center of the king post and at right angles to the plane of rotation of the wheels will pass through the center of a circle which subscribes the two tracks. In other words, the plane of rotation of the wheels of each bogie will be tangent to the respective tracks at the four king posts. The amount of flexing of the tires for traveling around curves is, therefore, reduced to a minimum. The planes of rotation of the wheels on the opposed bogies remains parallel, and therefore, the treads of the rear wheels will follow the same tracks as the treads of the front wheels, whether the vehicle is moving in a straight path or in a curved path to either side. Then again, by swinging the bogies at both ends of the vehicle in a definite relation to each other, it is possible to steer around a short radius curve without swinging any of the bogies excessively.

The shaft which directs the wheels of the bogies from the motors have telescoping sections to permit the shifting of the bogies vertically without disturbing, in any way, the driving connections therefor. These telescoping connections in the driving elements also permit the bogies to oscillate about a horizontal axis when traveling over rough terrain, as clearly shown in Fig. 4 of the drawings.

The actuating shaft 55 is mounted in suitable bearings in a bracket 75. Mounted on the shaft in said bracket is a sprocket wheel 76. The shaft extends through the bracket and is connected to a motor indicated diagrammatically at 77. This is a fluid-operated motor. Fluid pipes 78 and 79 lead from the motor to a valve housing 80, and a pipe 81 connects this valve housing with the storage tank 46. This valve housing is so constructed that fluid may be supplied to the motor for turning the same in one direction or the other, and thus the vehicle may be steered through the operation of the fluid motor 77, or may be steered by hand through the turning of the sprocket wheel 76. When air is used as a source of fluid pressure for steering, the air pressure may be regulated as admitted to the motor, so that the operator can avoid skidding the wheels laterally and protect the tires against excessive wear.

Figures 16, 17:
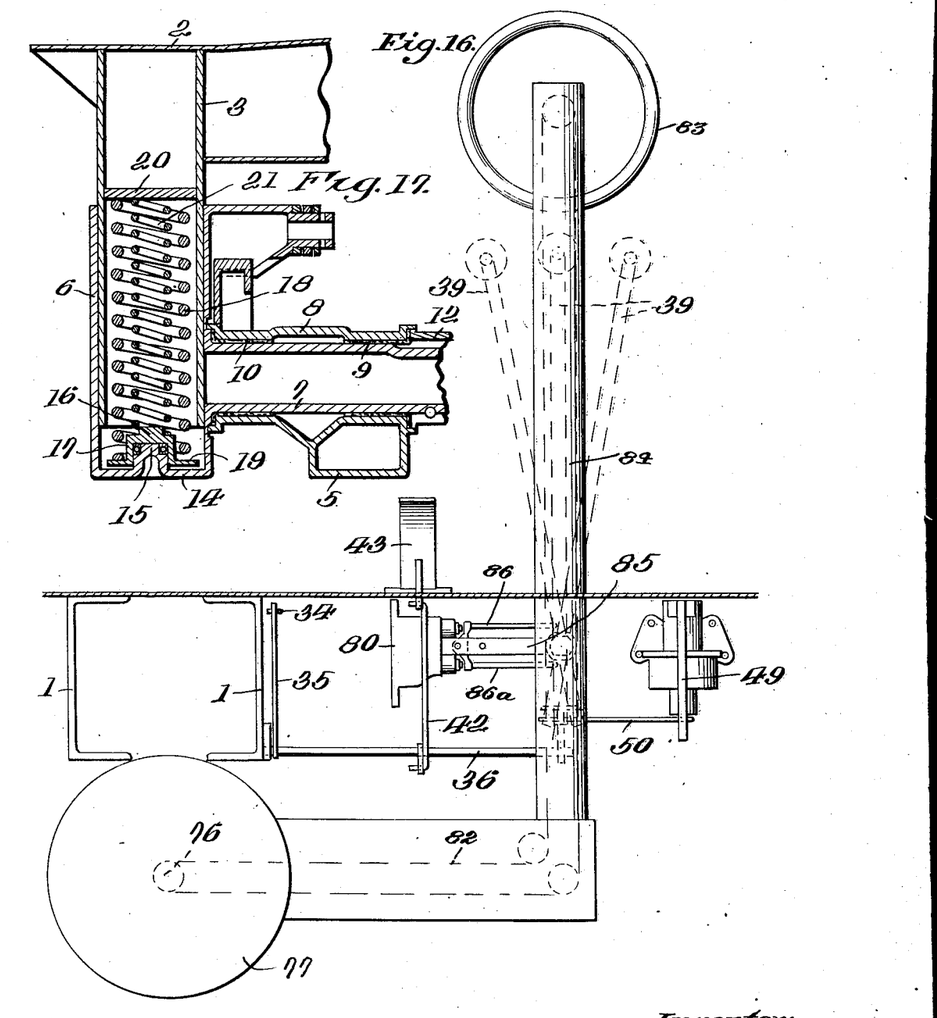
Fig. 16 is a view partly in section and partly in elevation showing a mechanical means for steering the vehicle and also the different positions of the control stick for operating the valves of the fluid means for actuating the steering shaft.
Fig. 17 is an enlarged detail showing the gimbal support on which the bogie frame oscillates and in which the king post is mounted, and also showing the steering arm for turning the bogie frame about the vertical axis of the king post.

A sprocket chain 82, shown diagrammatically in Fig. 16 is operated by a steering wheel 83 mounted at the upper end of a standard 84. When the steering wheel is turned in one direction, the steering shaft will be actuated for turning the bogies so as to cause the vehicle to follow a curved path to the right, and when it is turned in the other direction, then it will cause the bogies to be set so that the vehicle will be set to follow a curved path at the left. The vehicle may be guided through this steering mechanism in the same way, regardless of whether the vehicle is moving forward or moving rearward.

The valves in the valve housing 80 are controlled by the control stick 39. Extending outwardly from the valve housing 80 are parallel supporting bars 85 to which the bracket 40 is attached. A trip rod 86 is pivotally carried by the supporting bars 85, and this rod 86 terminates adjacent the control stick, when said control stick is in a central position. If the control stick is turned to the left, as viewed in Fig. 16, it will operate the upper valve and thus supply fluid to the motor so that it is caused to rotate in one direction. There is a similar trip rod 86a carried by the supporting bars 85, and when the control stick is moved to the right, as viewed in said figure, then the lower trip rod is operated, and will cause fluid to flow to the motor so as to turn the actuating shaft in the opposite direction. The valves are so positioned that when the control stick is turned to the left, as viewed in the forward direction of travel, the vehicle will be caused to move in a curved path to the left, and when the control stick is turned to the right, then the vehicle will move to the right.

It will be noted from Fig. 12 that the control stick may be shifted laterally for guiding the vehicle without moving the same forwardly or rearwardly. Therefore, the control stick may be set for driving the vehicle at a certain speed, and then the vehicle guided in any desired path without changing the speed. On the other hand, the speed can be increased or decreased without changing the direction of travel. Likewise, the brakes can be applied without changing the direction of travel. Furthermore, inasmuch as the control of the motor, the control of the brakes and the guiding of the vehicle, is all accomplished through the one control stick, the operator can readily control the travel of the vehicle either in a forward or rearward direction from the same position in the vehicle.

While the means for mounting the bogies on the king post is the preferred form of means, it will be understood that other types of construction may be used in connection with my improved steering mechanism. It is essential that the bogie frame shall be mounted so that it may turn about a vertical axis on the king post with which it is associated. While the motors have been described as hydrocarbon motors, it will be understood that electric motors, or any suitable motor may be used for driving the wheels. While the braking mechanism is shown as applied to the shaft of each motor, it may be applied to the wheels in the well-known manner and controlled by the fluid-pressure valve described above. So far as the specific mounting of the bogie frames on the king posts is concerned, and the turning of the same for guiding the vehicle, it will be understood that the driving means may be omitted, particularly where the bogie mounting is used on a trailer. It is obvious that many changes in the details of construction may be made without departing from the spirit of the invention as set forth in the appended claims.

Having thus described the invention, what I claim as new and desire to secure by Letters Patent, is:

1. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axes including an arm connected to each bogie and extending toward the center plane of the frame, mechanical devices for connecting the arm of the front right bogie with the arm of the left rear bogie, mechanical devices for connecting the arm of the left front bogie with the arm of the right rear bogie, and means for shifting said mechanical devices for turning the bogies.

2. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axes including an arm connected to each bogie and extending toward the center plane of the frame, mechanical devices for connecting the arm of the front right bogie with the arm of the left rear bogie, mechanical devices for connecting the arm of the left front bogie with the arm of the right rear bogie, and means for shifting said mechanical devices for turning the bogies, the connections between the mechanical devices and the arms of the front bogies being slightly in front of a transverse plane containing the vertical axes of said bogies and the connections between the mechanical devices and the arms of the rear bogies slightly in rear of a transverse plane containing the vertical axes of said bogies, whereby the wheels of the opposed bogies will be maintained in parallel planes of rotation in all positions of travel.

3. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axis including an arm connected to each bogie and extending toward the center plane of the frame, members mounted on the frame for independent movement parallel to the longitudinal axis of said frame, links connecting one of said members with the arm of the right front bogie and the arm of the left rear bogie, links connecting the other said member with the arm of the left front bogie and the arm of the right rear bogie, and means under the control of the operator for causing simultaneous endwise movement of said members in opposite directions.

4. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axes including an arm connected to each bogie and extending toward the center plane of the frame, members mounted on the frame for independent movement parallel to the longitudinal axis of said frame, links connecting one of said members with the arm of the right front bogie and the arm of the left rear bogie, links connecting the other said member with the arm of the left front bogie and the arm of the right rear bogie, an actuating shaft having right and left-hand threaded sections, a steering head connected to one of said members and cooperating with one of said threaded sections, and a steering head connected to the other member and cooperating with the other threaded section whereby the turning of the shaft will cause said members to move endwise in opposite directions, said shaft operating to hold said members in a set position when it is not being actuated.

5. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axes including an arm connected to each bogie and extending toward the center plane of the frame, members mounted on the frame for independent movement parallel to the longitudinal axis of said frame, links connecting one of said members with the arm of the right front bogie and the arm of the left rear bogie, links connecting the other said member with the arm of the left front bogie and the arm of the right rear bogie, an actuating shaft having right and left-hand threaded sections, a steering head connected to one of said members and cooperating with one of said threaded sections, a steering head connected to the other member and cooperating with the other threaded section whereby the turning of the shaft will cause said members to move endwise in opposite directions, said shaft operating to hold said members in a set position when it is not being actuated, a fluid motor for rotating said shaft, and mechanical means for independently rotating said shaft.

6. A vehicle comprising a frame, opposed bogies at the opposite ends of said frame, wheels at the opposite ends of each bogie, means for supporting each bogie whereby the bogie may turn about a vertical axis, oscillate about a horizontal axis, and have a vertical movement relative to the frame, a steering mechanism for turning the bogies about their vertical axes including an arm connected to each bogie extending toward the center plane of the frame, a steering shaft, and devices actuated thereby and connected to said arms for positioning said bogies so that the planes of rotation of the wheels of opposed bogies will be maintained substantially parallel for all positions of travel.

7. A vehicle comprising a frame, opposed bogies at the opposite ends of said frame, wheels at the opposite ends of each bogie, means for supporting each bogie whereby the bogie may turn about a vertical axis, oscillate about a horizontal axis and have a vertical movement relative to the frame, a steering mechanism for turning the bogies about their vertical axes including an arm connected to each bogie extending toward the center plane of the frame, a steering shaft, devices actuated thereby and connected to said arms for positioning said bogies so that the planes of rotation of the wheels of opposed bogies will be maintained substantially parallel for all positions of travel, a fluid motor for operating said shaft, valves for controlling said motor, a control stick for operating said valves whereby the movement of said control stick toward the left side of said vehicle will cause said vehicle to travel in a curved path to the left, and a movement of the control stick to the right side of said vehicle will cause said vehicle to travel in a curved path to the right.

8. A vehicle comprising a frame, opposed bogies at the opposite ends of said frame, wheels at the opposite ends of each bogie, means for supporting each bogie whereby the bogie may turn about a vertical axis, oscillate about a horizontal axis and have a vertical movement relative to the frame, a steering mechanism for turning the bogies about their vertical axes including an arm connected to each bogie extending toward the center plane of the frame, a steering shaft extending longitudinally of the vehicle and having right and left-hand threaded sections, a steering head associated with each threaded section whereby the rotation of the shaft in one direction will move the steering heads toward each other and in the other direction will separate the steering heads, devices connecting one of said steering heads with the arm of the front right bogie and the arm of the left rear bogie, and devices connecting the other steering head with the arm of the left front bogie and the arm of the right rear bogie, and a thrust bearing for said actuating shaft for restraining the same against movement in either direction.

9. A vehicle comprising a frame, opposed bogies at the opposite ends of said frame, wheels at the opposite ends of each bogie, means for supporting each bogie whereby the bogie may turn about a vertical axis, oscillate about a horizontal axis and have a vertical movement relative to the frame, a steering mechanism for turning the bogies about their vertical axes including an arm connected to each bogie extending toward the center plane of the frame, a steering shaft extending longitudinally of the vehicle and having right and left-hand threaded sections, rods mounted on said frame parallel with the shaft for independent endwise movement, a steering head associated with one of said threaded sections and having an adjustable connection with one of said rods, a steering head associated with the other threaded section and having an adjustable connection with the other rod, links connecting one of said rods, respectively, with the arm of the front right bogie and the arm of the left rear bogie, and links connecting the other rod, respectively, with an arm of the left front bogie and the arm of the right rear bogie, said connections being such as to permit the free movement of the bogies about their vertical axes and also vertically relative to the frame.

10. A vehicle comprising a frame including transverse bolsters at the opposite ends of said vehicle, a king post carried at the outer end of each bolster, a bogie frame associated with each king post and disposed at one side thereof, wheels at the opposite ends of each bogie, means for connecting said bogie to said king post whereby the bogie is free to oscillate about a horizontal axis, turn about a vertical axis centrally of the king post, and move vertically relative to the frame, an arm connected to each bogie and extending toward the center plane of the vehicle, and a steering mechanism connected to said arms for turning the bogies about their vertical axes.

11. A vehicle comprising a frame including transverse bolsters at the opposite ends of said vehicle, a king post carried at the outer end of each bolster, a bogie frame associated with each king post and disposed at one side thereof, wheels at the opposite ends of each bogie, means for connecting said bogie to said king post whereby the bogie is free to oscillate about a horizontal axis, turn about a vertical axis centrally of the king post and move vertically relative to the frame, an arm connected to each bogie and extending toward the center plane of the vehicle, a steering mechanism connected to said arms for turning the bogies about their vertical axes, said steering mechanism including devices connecting the arm of the front right bogie with the arm of the left rear bogie, and devices for connecting the arm of the left front bogie with the arm of the right rear bogie.

12. A vehicle comprising a frame including transverse bolsters at the opposite ends of said vehicle, a king post carried at the outer end of each bolster, a bogie frame associated with each king post and disposed at one side thereof, wheels at the opposite ends of each bogie, means for connecting said bogie to said king post whereby the bogie is free to oscillate about a horizontal axis, turn about a vertical axis centrally of the king post and move vertically relative to the frame, an arm connected to each bogie and extending toward the center plane of the vehicle, a steering mechanism connected to said arms for turning the bogies about their vertical axes, said steering mechanism including an actuating shaft having right and left-hand threaded sections, a steering head associated with each section, devices for connecting one of said steering heads with the arm of the front right bogie and the arm of the left rear bogie, and devices for connecting the other steering head with the arm of the left front bogie and the arm of the right rear bogie.

13. A vehicle comprising a frame, opposed bogies at the opposite ends of said frame, wheels at the opposite ends of each bogie, means for supporting each bogie whereby it may turn about a vertical axis and oscillate about a horizontal axis, a steering mechanism connected to the bogies for turning the same about their vertical axes including an actuating shaft, a fluid motor for actuating said shaft, valves controlling said motor, a control stick for operating said valves, whereby when said stick is shifted laterally in one direction, each bogie will be turned about a vertical axis so that the vehicle will travel in a curved path, and whereby when said control stick is shifted laterally in the opposite direction, the vehicle will travel in a curved path to the opposite side.

14. A vehicle comprising a frame opposed bogies at the opposite ends of said frame, wheels at the opposite ends of each bogie, means for supporting each bogie whereby it may turn about a vertical axis and oscillate about a horizontal axis, a steering mechanism connected to the bogies for turning the same about their vertical axes including an actuating shaft, a fluid motor for actuating said shaft, valves controlling said motor, a control stick for operating said valves, whereby when said stick is shifted laterally in one direction each bogie will be turned about a vertical axis so that the vehicle will travel in a curved path, and whereby when said control stick is shifted laterally in the opposite direction, the vehicle will travel in a curved path to the opposite side, a motor associated with each bogie for rotating the wheels thereof, control devices for said motor whereby the motors may be accelerated, a brake mechanism associated with each bogie, devices operated by a movement of the control stick in a direction lengthwise of the vehicle for accelerating the motors, and devices operated by the control stick when moved in the opposite direction lengthwise of the vehicle for applying the brakes, said control devices for the motor and the brakes being disposed so as to permit the shifting of the control stick laterally for steering while maintaining the control for the accelerator or the brakes in a set position.

15. A vehicle comprising a frame, opposed bogies at opposite ends of said frame, wheels at the opposite ends of each bogie, means for supporting each bogie whereby the bogie may turn about a vertical axis and oscillate about a horizontal axis, a steering mechanism for turning the bogies about their vertical axes including mechanical devices connecting the front right bogie with the left rear bogie whereby said bogies are turned in opposite directions on their respective axes, mechanical devices connecting the left front bogie with the right rear bogie whereby said bogies are turned in opposite directions about their respective axes, and means directly connected to said mechanical devices for causing the front bogies to turn in one direction and the rear bogies to turn in the opposite direction on their respective axes.

16. A vehicle comprising a frame, opposed bogies at opposite ends of said frame, wheels at the opposite ends of each bogie, means for supporting each bogie whereby the bogie may turn about a vertical axis and oscillate about a horizontal axis, a steering mechanism for turning the bogies about their vertical axes including mechanical devices connecting the front right bogie with the left rear bogie whereby said bogies are turned in opposite directions on their respective axes, mechanical devices connecting the left front bogie with the right rear bogie whereby said bogies are turned in opposite directions about their respective axes, and means directly connected to said mechanical devices for moving one of said devices in a forward direction and the other in a rearward direction for causing the front bogies to turn in one direction and the rear bogies to turn in the other direction on their respective axes.

HENRY FORT FLOWERS.